United States Patent [19]

Hills et al.

[11] 4,417,349
[45] Nov. 22, 1983

[54] SCA DATA TRANSMISSION SYSTEM WITH A RAISED COSINE FILTER

[75] Inventors: Michael Hills, McLean, Va.; Clay Durret, Huntsville, Ala.; William Von Meister, McLean, Va.

[73] Assignee: Digital Broadcasting Corporation, McLean, Va.

[21] Appl. No.: 92,463

[22] Filed: Nov. 8, 1979

[51] Int. Cl.³ .......................... H04H 5/00; H04L 25/03
[52] U.S. Cl. ...................................... 375/60; 370/71; 381/4
[58] Field of Search ...................... 375/58-60, 375/18; 455/45, 61; 179/1 GC, 1 GD; 360/42, 43, 65; 370/71; 364/724, 200, 900; 371/49

[56] References Cited

U.S. PATENT DOCUMENTS

| | | | |
|---|---|---|---|
| Re. 29,257 | 6/1977 | Nash et al. | 375/96 |
| 3,323,061 | 5/1967 | Davis | 375/42 |
| 3,454,718 | 7/1969 | Perreault | 375/64 |
| 3,478,169 | 11/1969 | Saito | 179/1 GD |
| 3,490,049 | 1/1970 | Choquet et al. | 375/80 |
| 3,492,578 | 1/1970 | Gerrish et al. | 375/18 |
| 3,647,964 | 3/1972 | Tang | 375/18 |
| 3,699,445 | 10/1972 | Kinsel | 455/608 |
| 3,706,054 | 11/1970 | Starr et al. | 375/42 |
| 3,714,375 | 1/1973 | Stover | 375/42 |
| 3,773,975 | 11/1973 | Koziol | 375/62 |
| 3,794,928 | 2/1974 | Stump et al. | 375/81 |
| 3,824,468 | 7/1974 | Zegers et al. | 455/61 |
| 3,846,583 | 11/1974 | Boulter | 375/55 |
| 3,919,640 | 11/1975 | Simciak | 375/42 |
| 3,922,607 | 11/1975 | Wysong | 455/45 |
| 3,991,389 | 11/1976 | Dwire | 375/62 |
| 4,003,002 | 1/1977 | Snijders et al. | 375/60 |
| 4,025,905 | 5/1977 | Gorgens | 364/900 |
| 4,066,841 | 1/1978 | Young | 375/49 |
| 4,087,677 | 5/1978 | Dunn et al. | 375/9 |
| 4,087,752 | 5/1978 | Melvin | 375/86 |
| 4,090,135 | 5/1978 | Farstad et al. | 375/45 |
| 4,090,138 | 5/1978 | Voorman et al. | 375/42 |
| 4,101,833 | 7/1979 | Bingham et al. | 375/58 |
| 4,112,369 | 9/1978 | Forman et al. | 370/71 |
| 4,135,057 | 1/1979 | Bayless et al. | 375/58 |
| 4,227,184 | 10/1980 | Howells et al. | 360/43 |
| 4,246,440 | 1/1981 | Van Der Heide | 179/1 GD |

OTHER PUBLICATIONS

Arredondo, G. A. et al., Voice and Data Transmission, Jul. 28, 1978, The Bell System Technical Journal, vol. 58, No. 1, Jan. 1979, pp. 97-122.

Member of Technical Staff Bell Telephone Lab, Transmission System for Communication, Nov. 16, 1970, Fourth Edition, pp. 715-718.

*Primary Examiner*—Benedict V. Safourek
*Assistant Examiner*—Stephen Chin
*Attorney, Agent, or Firm*—Kenyon & Kenyon

[57] ABSTRACT

A system and method for transferring digital data via the sub-carrier of a commercial broadcast FM radio station. Digital data generated by an originating subscriber is shaped with substantially a raised cosine response in the time domain. The shaped signal is then pre-emphasized and used to frequency modulate (direct angle modulate) a sub-carrier. The sub-carrier in turn frequency modulates the carrier and the data is transmitted by the radio station along with its commercial program. A receiving subscriber detects the sub-carrier and decodes and displays the originated data.

19 Claims, 13 Drawing Figures

SCA DATA TRANSMISSION SYSTEM WITH A RAISED COSINE FILTER

BACKGROUND OF THE INVENTION

This invention relates to data transmission systems and more particularly to digital data transfer throughout a network of subscribers.

It has become increasingly important to be able to transfer digital data from point-to-point at high data rates and at low cost throughout a large network of subscribers. Available communications channels have a finite bandwidth and thus present theoretical limits to the rate that information can be transferred. As a practical matter, it is important to achieve as efficient a data transfer as possible within the bandwidth available.

Data in digital format is presently transmitted point-to-point by a variety of systems and methods. Telephone line systems employ a MODEM at each end of a telephone line. A transmitting subscriber uses a MODEM at one end of the telephone line to encode the data into audio tones for transmission to the MODEM at the other end of the telephone line where the data is decoded. Typically, a 9600 bits/second data rate can be achieved over a telephone data link.

However, it has heretofore not been possible to achieve data rates approaching the telephone line data rate in data transfer systems utilizing the subsidiary communications channels available on commercial broadcast FM radio stations.

Conventional digital data transfer via a radio sub-carrier utilize a frequency shift keying (FSK) system. Digital data is coupled into an FSK MODEM. The FSK MODEM frequency modulates an audio carrier (approximately 1800 Hz.) The audio carrier is shifted between two different frequencies, one corresponding to a "1" and the other corresponding to a "0". This frequency shift keyed (FSK) audio signal is then used to frequency modulate a sub-carrier with a center frequency of 67 KHz. The modulated sub-carrier is then added to the commercial program stereo signal, and the composite signal is used to modulate the FM carrier. This conventional data transfer technique allows the use of off the shelf FSK MODEM equipment and no modification of the broadcast FM radio station equipment is required. In essence, an audio channel is being provided and data is transmitted as audio tones. The rate of digital data transfer for such systems is limited. The data rate limitation for conventional systems using frequency modulation arises because their baud rate cannot be increased without violating bandwidth and attenuation requirements imposed by FCC regulation.

FCC regulations require that the amplitude of the sub-carrier of an FM broadcast radio station be 20 dB attenuated from the level created by full modulation and that harmonics from the modulation of the sub-carrier be 60 dB attenuated for all frequencies below 53 KHz (see FCC regulations §73.319 Subsidiary communications multiplex operations: engineering standards). Heretofore, in order to achieve high data rates without exceeding FCC guidelines, it would have been necessary to utilize complicated phase modulation (PM) techniques. Such techniques require the use of costly equipment at both ends of the data link.

In order to overcome the rate of data transfer limitation associated with transmitting digital data via the conventional FSK modulation scheme over a commercial broadcast FM radio station, and to provide a more economical system and data communications network, a data transmission system is provided which utilizes a linear modulation technique allowing significantly higher rates of data transfer, typically in the range of 4800 bits/second while maintaining a low error rate and while meeting all FCC bandwidth and attenuation standards.

SUMMARY OF THE INVENTION

The data transfer system according to the present invention recognizes the need for high speed digital data transfer throughout a network of subscribers. The system utilizes techniques that permit equipment costs to be kept to a minimum, while providing a low error rate and while satisfying FCC requirements placed upon subsidiary communications.

The overall system concept provides for digital data transfer between an originating subscriber and a receiving subscriber in a network of such subscribers. An originating subscriber generates digital data which is coupled via telephone line to a central message switching computer. The central message switching computer, by reading an address code sent as a portion of the originated data, selects a commercial broadcast FM radio station in a city close to the intended receiving subscriber. The data is routed to the selected broadcast FM radio station where a signal shaper shapes the data in the time domain according to Nyquist criteria. The signal shaper has a time response that is a close approximation to a raised cosine [$f(t) = \frac{1}{2}(1 + \cos wt)$]. This shaping produces digital data shaped equivalent to the resulting signal if the data had been passed through a filter exhibiting vestigal frequency and phase symmetry. Once shaped, the data is used to linearly modulate the sub-carrier of the selected broadcast FM radio station. The sub-carrier in turn frequency modulates the carrier of the broadcast FM radio station and the data is transmitted by the broadcast FM radio station along with its regular commercial program.

Subscribers near the city where the FM broadcast station to which the data has been routed is located are continuously tuned to that broadcast FM radio station with a receiver for detecting the linearly modulated sub-carrier and decoding data from the sub-carrier. When a particular receiver recognizes its address preceeding a stream of data, it causes the data to be displayed. A parity checking system helps to insure accurate data transfer.

By using a bi-polar direct modulation scheme incorporating the appropriate signal shaper for linearly modulating the sub-carrier of a commercial broadcast FM radio station, the present system is able to provide 4800 bits/second data transfer while remaining within FCC requirements for bandwidth and attenuation around the sub-carrier frequency and without interfering with the commercial program being transmitted to its listeners by the FM broadcast radio station. The use of direct linear frequency modulation provides for increased data rate capability, enhanced signal to noise ratio, while reducing the error rate as compared to the use of other types of data transfer systems. The system lends itself to the formation of a network of subscribers, able to communicate with one another in a low cost, efficient manner.

The system according to the present invention provides a sufficiently narrow bandwidth so that it achieves better than 60 dB attenuation at 53 KHz and below (sub-carrier is 67 KHz).

The overall system concept is to provide a high speed data transfer system utilizing the subsidiary communications channel of a broadcast FM radio station, and to do so using a frequency modulation rather than phase modulation thereby allowing less complex and less costly equipment than that required for phase modulation systems.

One way to achieve frequency modulation is to use direct modulation because it reduces bandwidth limitations. It is possible to modulate a sub-carrier with the square wave data (FSK). However, the FSK method produces out of band harmonics which would have to be filtered out with a post modulation filter.

To avoid the need for a post modulation filter the system herein described uses a linear frequency modulator driven by a shaped data signal. The data signal is shaped to accomplish two purposes. First proper shaping maintains the out of band modulation products below 40 dB from the sub-carrier (60 dB from full modulation level). Secondly, the shaping maximizes the system tolerance to intersymbol interference resulting from an imperfect transmission media (transmitter, transmission path, and receiver).

In order to shape a signal so as to satisfy Nyquist's vestigal symmetry theorem, it would be considered appropriate to filter with a frequency response having a raised cosine response. However, in the present system, the signal is shaped in the time domain and then utilized to linearly modulate the sub-carrier. In this manner, the system accomplishes effectively the same result as if the data signal were used to directly modulate the sub-carrier and then filtered by an analog filter in the frequency domain. In essence, the system demonstrates that the data can advantageously be shaped by a raised cosine response in the time domain and then used to linearly frequency modulate the sub-carrier.

It has been further determined that the preferred means for implementing the time domain raised cosine filtering was by utilizing shift registers with weighted resistor output stages.

In addition the modulation scheme used in the present invention transforms data arriving in non-return to zero (NRZ) format into an alternate mark inversion (AMI) line code (one of many possible line code choices).

BRIEF DESCRIPTION OF THE DRAWINGS

Many of the attendant advantages of the present invention will be readily apparent as the invention becomes better understood by reference to the following detailed description with the appended claims, when considered in conjunction with the accompanying drawings, wherein:

FIG. 11 is a block diagram of the decoder in the receiver; and

DETAILED DESCRIPTION OF THE PREFERRED EMBODIMENT

Figure 1:
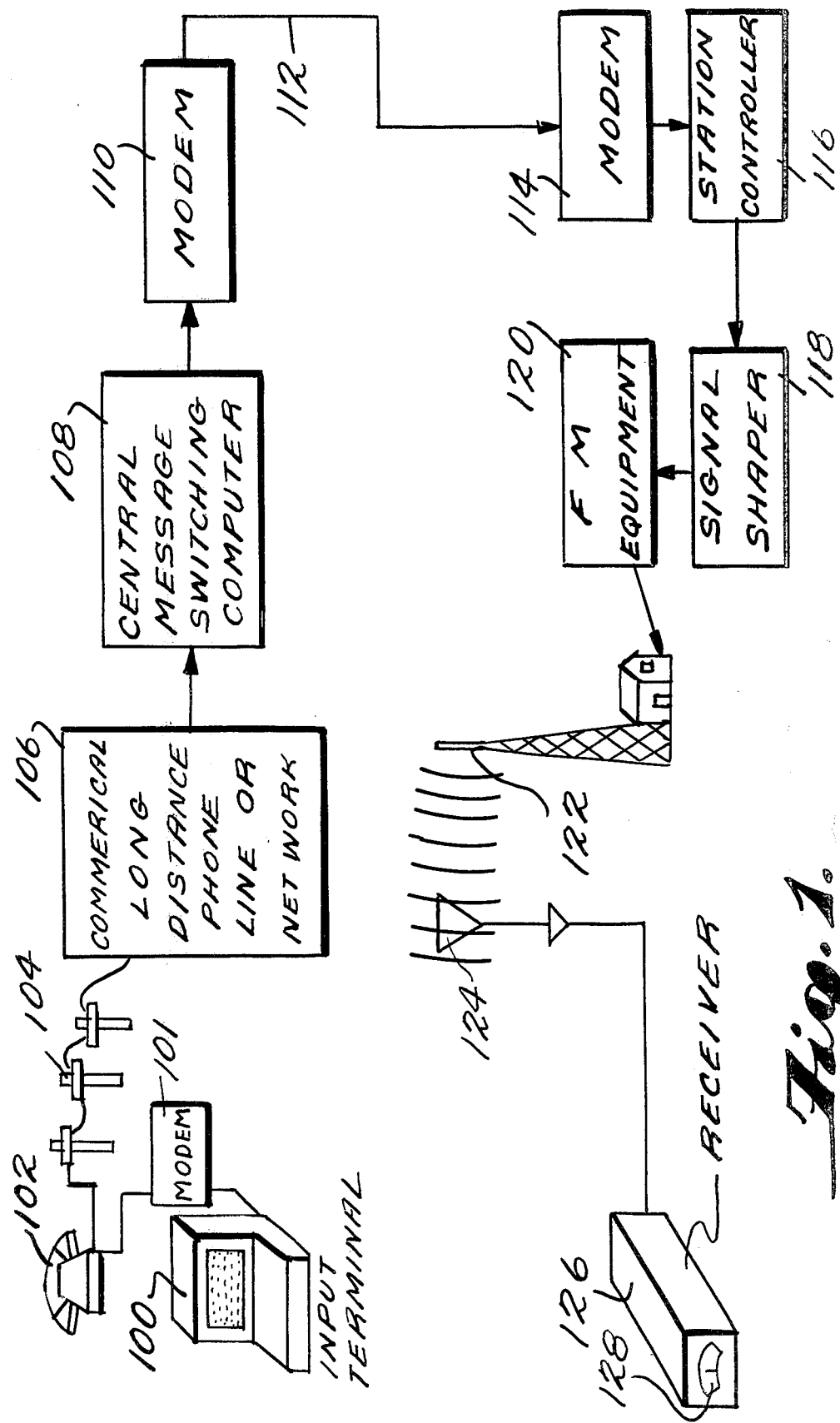
FIG. 1 is a pictorial and block diagram of the present transmission system according to the present invention.

Referring now to FIG. 1, there is shown a pictorial and block diagram of the data transmission system according to the present invention. An originating subscriber generates data to be transmitted to a receiving subscriber who may be in a distant city. The originating subscriber keys in the data to be transmitted on an input terminal 100. Typically, the input terminal 100 is capable of transmitting data in the range of 110–1200 baud.

By using a conventional MODEM 101 and a local telephone 102, the originating subscriber places a local call to a commercial long distance telephone network or facility 106 such as TELENET or TYNMET. Data originated at input terminal 100 is coupled to the commercial long distance telephone network 106 via the originating subscriber's local telephone 102 and local telephone lines 104.

The commercial long distance network 106 communicates to a central message switching computer 108. The function of central message switching computer 108 is to select and transmit the data from the originating subscriber to a broadcast FM radio station close to the intended receiving subscriber. Selection of an appropriate FM broadcast radio station is made by comparing address bits of data generated by the originating subscriber with a predetermined set of address codes stored in a memory associated with central message switching computer 108. Thus, the originating subscriber is able to select the destination of his message by keying in the appropriate address code. Central message switching computer 108 recognizes the address code and routes the message to an FM broadcast radio station located near the intended receiver subscriber.

Once central message switching computer 108 has selected an appropriate FM broadcast radio station (near the addressee city) it communicates with that radio station via a commercial telephone line. The message is converted into audio tones suitable for transmission via telephone line by a standard MODEM 110, typically a Bell 201 or equivalent. MODEM 110 is coupled to a commercial telephone line 112 routed to the radio station to which the message is to be sent. At the radio station, a second MODEM 114 converts the message back into a digital data stream.

Once converted back into a digital format, the message is routed through a station controller 116 which converts the data into a 4800 baud synchronous data stream. The message is then coupled to a signal shaper 118 having a predetermined filter characteristic for appropriately altering the shape of the digital pulses comprising the message. Once the data stream has been shaped, it is coupled to standard FM broadcast radio equipment 120 for transmission via the broadcast antenna 122.

Shaped data from signal shaper 118 is utilized to frequency modulate (direct linear) a sub-carrier (usually 67 KHz.) of the broadcast carrier. The sub-carrier in turn frequency modulates an exciter which generates the broadcast carrier.

A receiver subscriber to whom the message is directed receives the FM broadcast signal via a receiving subscriber antenna 124 coupled to the front end of a receiver 126. The receiver 126 decodes the message and displays it on a display 128. Display 128 can be a printed paper roll, a cathode ray tube, or some other display.

Figure 2:
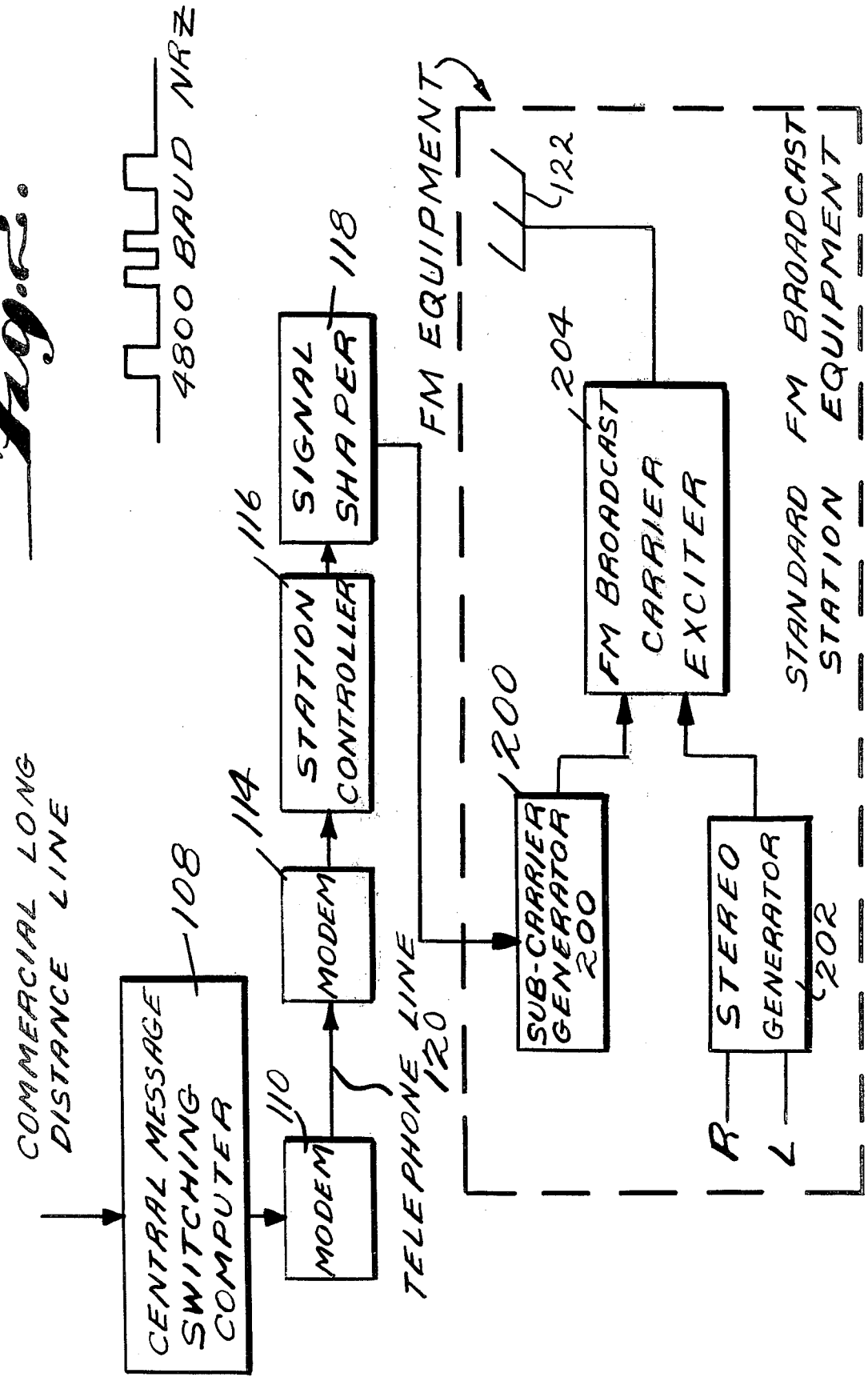
FIG. 2 is a block diagram of the transmitter.

Referring now to FIG. 2, further details of the transmitter are shown in block diagram. Messages are routed to a particular broadcast station via central message switching computer 108. The message is transmitted to the station via MODEM 110, telephone line 112, and MODEM 114. A station controller 116, located at the broadcast station converts the format of the message into a predetermined format of 4800 baud synchronous data for transmission. The output of signal shaper 118 is coupled to standard FM broadcast equipment shown inside the dotted line in FIG. 2.

The data from signal shaper 118 is utilized to frequency modulate a sub-carrier generated in generator 200. Assuming the broadcast station utilizes a standard stereo generator 202 for its regular commercial program having right channel (R) and left channel (L) inputs, the output of sub-carrier generator 200 and the stereo generator are both coupled to an FM exciter 204. The output of sub-carrier generator 200 and stereo generator 202 frequency modulate exciter 204 which generates the carrier for the commercial FM radio broadcast. Thus, the commercial broadcast signal transmitted via transmitting antenna 122 contains not only the commercial program information but also contains the message originated at input terminal 100.

Addressee information coded into the message at input terminal 100 is utilized not only by central message switching computer 108 to determine the appropriate broadcast station, but is also transmitted as part of the message by the selected broadcast FM station. By recognizing a particular address code, a receiving subscriber in a city served by the broadcast station selected is able to recognize and display messages intended for that subscriber.

Referring now to FIG. 2, there is shown a block diagram of signal shaper 118. Message data from station controller 116 arrives in a non-return to zero (NRZ) format, typical of the output of most data generation devices. The system utilizes synchronous transmission with eight bits/character with odd parity. The NRZ message data is coupled to a level changer 300 for rendering the message data CMOS level compatible. Thus, the output of level changer 300 is the message data at voltage levels compatible with CMOS circuitry. The output of level changer 300 is coupled to both a monitor circuit 302 and to a polarity adjusting circuit 304. Monitor circuit 302, incorporating various display lights, indicates the presence of data flowing from level changer 300.

The output message signal from polarity adjusting circuit 304 is coupled to the input of a bipolar alternate mark inversion (AMI) generator 306 for altering the data format to produce an alternative mark inversion line code. In AMI format if a "1" is being sent, a transistion (polarity change) takes place. However if a "0" is being sent, there is no transition. AMI generator 306 is bi-polar and generates positive and negative half signals. There are, of course, many other line codes available for use in data transmission systems and it should be understood that this invention is not limited to the particular code set forth.

The positive and negative half signals in signal lines 308 and 310 are coupled to a time domain filter 312 having a raised cosine response in the time domain. Time domain filter 312 includes two shift register filters 314 and 316 for shaping the positive and negative half signals in signal lines 308 and 310, respectively. After being shaped, the positive and negative half signals are combined by a summer 318 for reconstructing the shaped data. Time domain filter 312 operates in the time domain to provide a close approximation to a raised cosine response $[f(t) = \frac{1}{2}(1 + \cos wt)]$.

The output of summer 318 is coupled to a low pass filter 320 which in turn is coupled to a conventional pre-emphasis network 322 having a 150μ sec time constant. Low pass filter 320 removes harmonics produced by the shaping process. The output of pre-emphasis network 322 constitutes the output of signal shaper 118 which is coupled to sub-carrier generator 200 shown in FIG. 2.

A 16X data bit rate clock 324 in station controller 116 supplies clock pulses to a divider 326. Divider 326 provides both 8X data bit rate clock pulses and 1X data bit rate clock pulses for use by digital filter 312 and for use by bi-polar AMI generator 306, respectively. In addition, 1X data bit rate clock pulses are coupled from divider 326 back to station controller 116 for use in triggering data issuing therefrom.

In overall function, signal shaper 118 shapes the data signal in the time domain preparatory for linearly modulating the sub-carrier. By this technique it is possible to achieve the same effect as coupling the signal through an analog filter and into a linear modulator or coupling the signal through a modulator and then through a band pass filter. The detailed schematic of signal shaper 118 is shown in FIG. 4.

Figure 4:
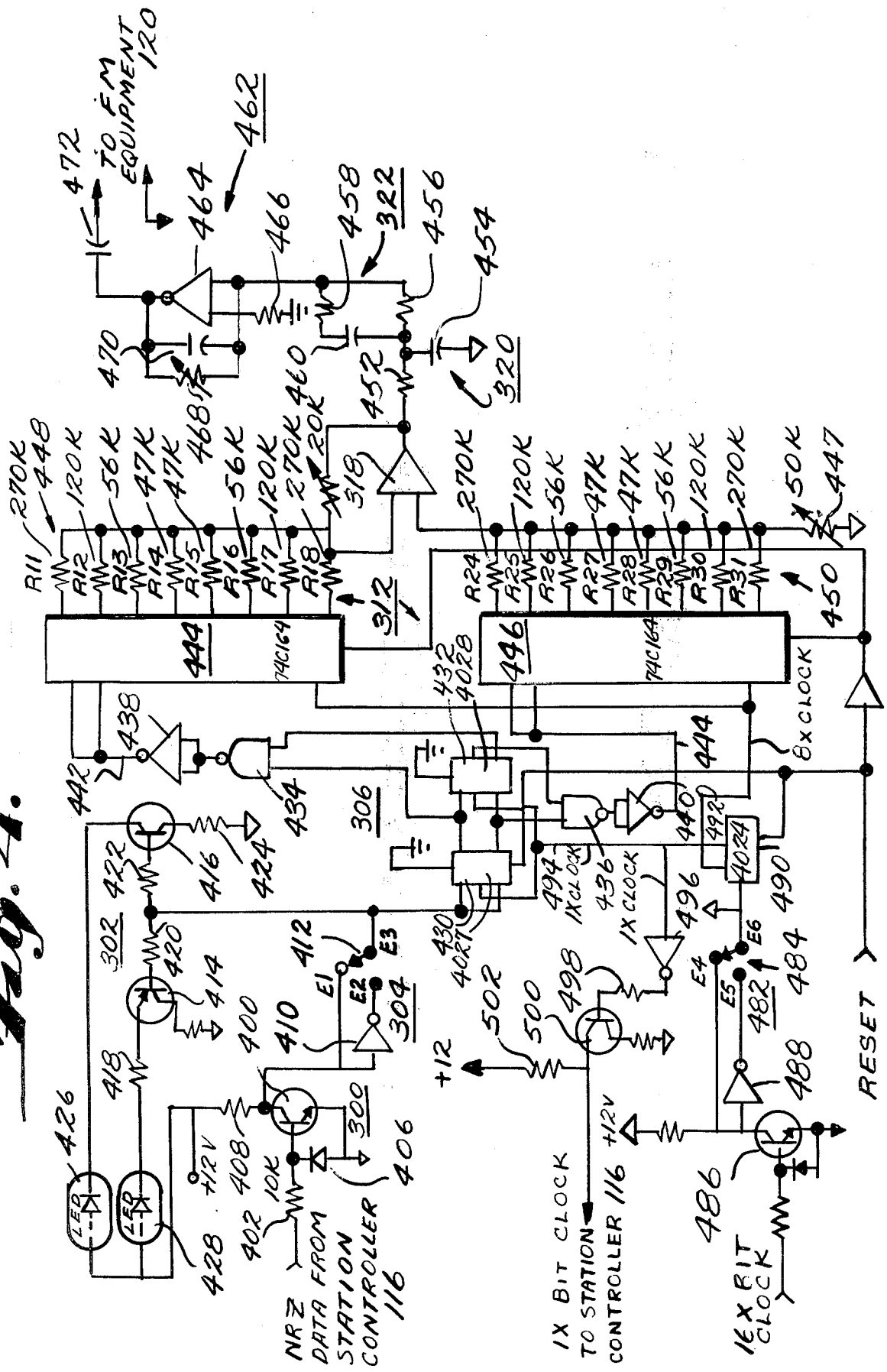
FIG. 4 is a detailed schematic diagram of the signal shaper.

Referring now to FIG. 4, there is shown a detailed schematic diagram of signal shaper 118. Non-return to zero (NRZ) data from station controller 116 is coupled to level changer 300. Data is coupled through an input resistor 402 to a transistor 400. Level changer 300 also includes resistor 408 and diode 406.

The output of level changer 300 is coupled to polarity adjusting circuit 304 including an inverter 410 and a switch 412 having contacts E1, E2 and E3. By selecting either contact E1 or E2 for connection to E3, data from level changer 300 can be inverted in polarity as desired. Thus, it does not matter which polarity message data is in at the station controller. Adjustment can be made by polarity adjusting circuit 304.

Monitor circuit 302 is coupled to contact E3 of switch 412 and indicates the presence of data at the output of polarity adjusting circuit 304. Monitor circuit 302 includes transistors 414 and 416, resistors 418, 420, 422, and 424 and LEDs 426 and 428. The presence of data triggers the conduction of transistors 414 and/or 416 thereby flashing LEDs 428 and/or 426, respectively.

Data from polarity adjusting circuit 304 is converted into bi-polar AMI format by bi-polar AMI generator 306. Bi-polar AMI generator 306 includes flip-flops 430 and 432 which are clocked at 1X data bit rate. Flip-flops 430 and 432 along with gates 434 and 436 and inverters 438 and 440 produce two separate data streams on lines 442 and 444. One of these data streams represents positive going voltages with respect to a zero reference level of the data and the other represents negative voltage swings from a zero reference of the data. These separate "half" data streams are coupled to time domain filter 312 including shift registers 444 and 446.

Time domain filter 312 provides a close approximation to a raised cosine response in the time domain f (t) = [½(1+cos wt)] which is achieved by proper selection of weighting resistors coupled to the output stages of each shift register. A first group of weighting resistors 448 including resistors R11–R18 is associated one each with the output stages of shift register 444. A second group of weighting resistors 450 including resistors R24–R31 is associated one each with the output stages of shift register 446. A varible resistor 447 commonly coupled to each of resistors 450 and to one input of summer 318 provides for symmetry adjustment. As the half data streams are shifted through the various stages of shift registers 444 and 446 at 8x data rate, the voltage level at the various shift stages is "pulled down" by a preselected amount by each weighting resistor.

The output voltage from summing amplifier 318 is controlled by the weighted sum of the input voltages presented to resistors R11–R18 and R24–R31. These resistors are chosen so that the presence of positive voltage on the input to one or the other of the shift registers for a single data clock period will produce a raised cosine response of the appropriate polarity.

The reconstructed and filtered data stream from summer 318 is coupled through low pass filter 320. To remove the high frequency components produced by the shaping circuits, low pass filter 320 includes resistors 452 and capacitor 454. The output of low pass filter 320 is coupled to pre-emphasis network 322 including resistors 456 and 458 and capacitor 460. An isolation amplifier stage 462 provides proper gain for the filtered signal for interfacing with the sub-carrier generator 200 and provides isolation. Isolation amplifier stage 462 includes an amplifier 464, resistors 466 and 468, and capacitors 470 and 472.

Figure 3:
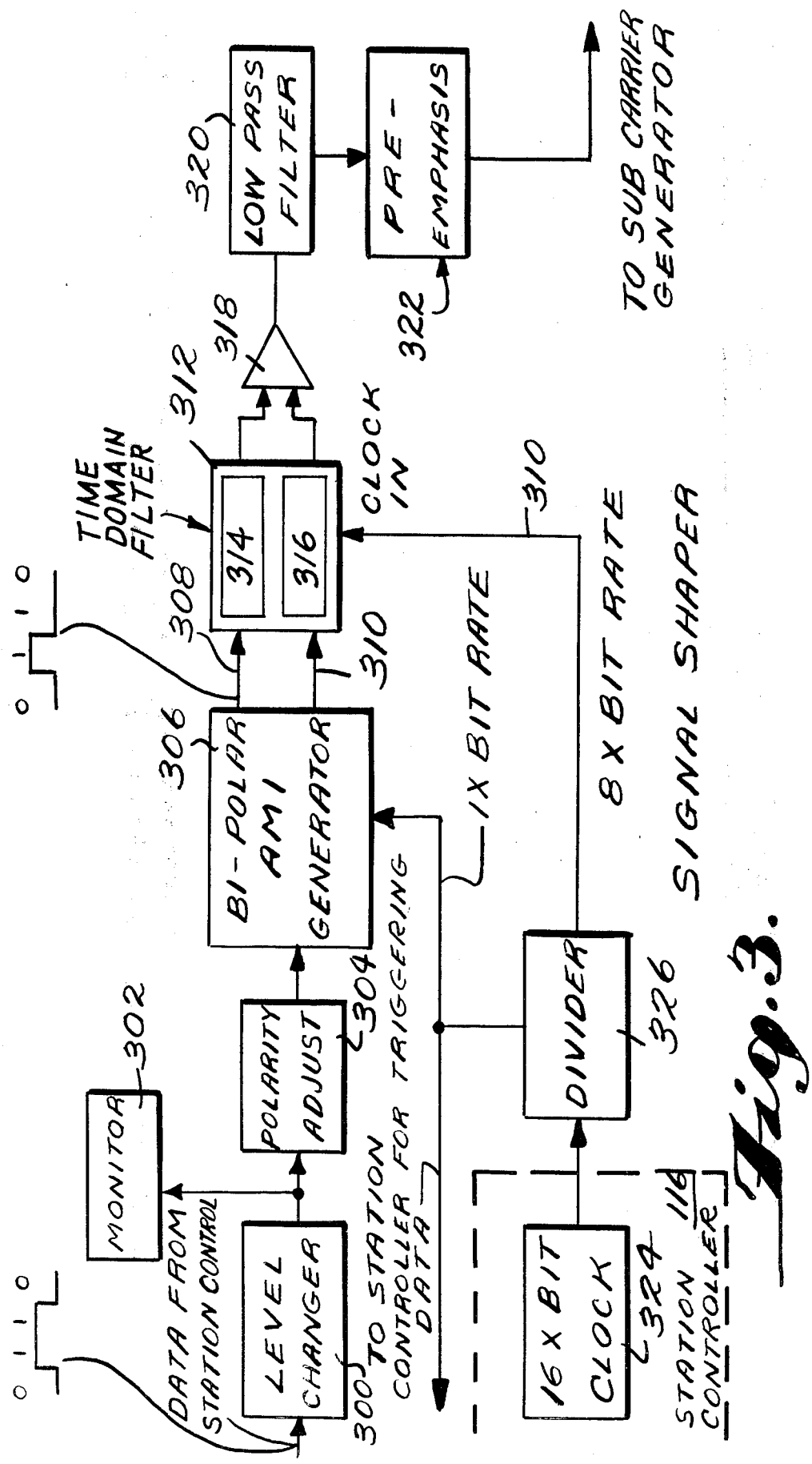
FIG. 3 is a block diagram of the signal shaper.

Clocking for bipolar AMI generator 306 and for shift registers 444 and 446 is provided by the 16X bit clock from the station controller (see FIG. 3) which is coupled to a polarity adjusting circuit 482. In a similar manner to the operation of polarity adjusting circuit 304, a switch 484 having contacts E4, E5 and E6 can select the clock signal entering signal shaper 118 and coupled through a transistor 486 or can select the clock signal coupled through transistor 486 and inverter 488. A divider 490 performs both a divide by two function and a divide by sixteen function. A divide by two clock (8X bit rate) on signal line 492 is used to clock shift registers 444 and 446. A 1X clock which is the product of a divide by sixteen function is coupled along signal path 494 and is utilized to clock flip-flops 430 and 432 in bipolar AMI generator 306.

In addition, a 1X clock signal is coupled through an amplifier 496 and resistor 498 to a transistor stage including transistor 500 and resistor 502 for coupling back to station controller 116.

Figure 5:
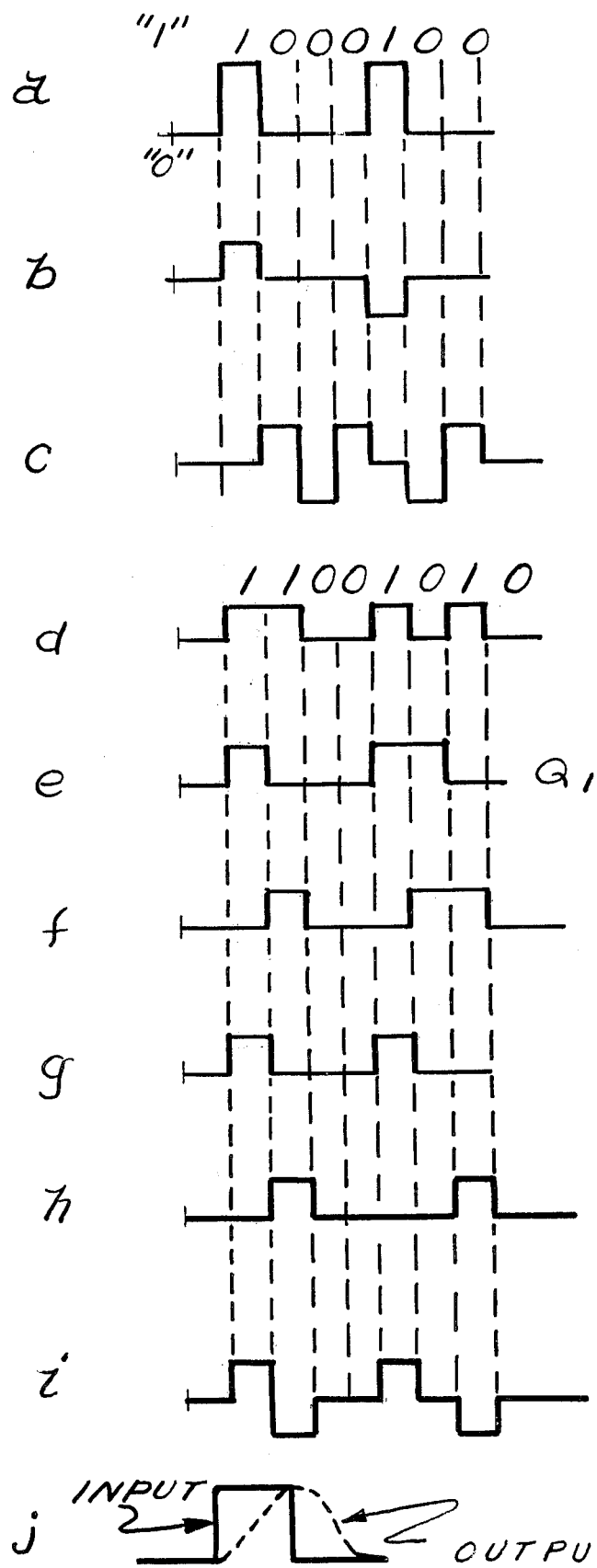
FIG. 5 depicts various waveforms associated with the operation of the signal shaper.

Referring now to FIG. 5, there are depicted various waveforms associated with the operation of signal shaper 118. Signal shaper 118 receives data in non-return to zero (NRZ) form as shown in FIG. 5(a). This input data is converted to bi-polar form by bi-polar AMI generator 306. The output of bi-polar AMI generator 306 reverses polarity if, on a clock pulse, a "1" is present at its input. Thus the input data signal shown in FIG. 5(a) would produce the signal shown in FIG. 5(b).

A suitable alternative would be to send alternating pulses for "0" bits as shown in FIG. 5(c). It is preferable to use the scheme illustrated in FIG. 5(c) because for "0" bits transistions are transmitted. This prevents the existence of an unmodulated sub-carrier which has a greater interference potential than a modulated sub-carrier. In addition, the receiver clock is provided with a signal more consistently in situations wherein asynchronous data is transmitted.

The bi-polar AMI data is produced by two JK flip-flops 430 and 432 which are clocked at the data rate. Assuming a data input to flip-flop 430 as shown in FIG. 5(d), flip-flop 430 changes state whenever its input is a "1" thereby providing a Q output as shown in FIGS. 5(e), (g), (h), and (i).

Flip-flop 432 delays the output of flip-flop 430 by one clock pulse and provides outputs as shown in FIGS. 5(f) (g), (h), and (i).

FIG. 5(i) represents the composite signal if it were not filtered. This is not an actual signal waveform existing within signal shaper 118 and is included only to provide a clearer understanding of the circuit.

Figure 6:
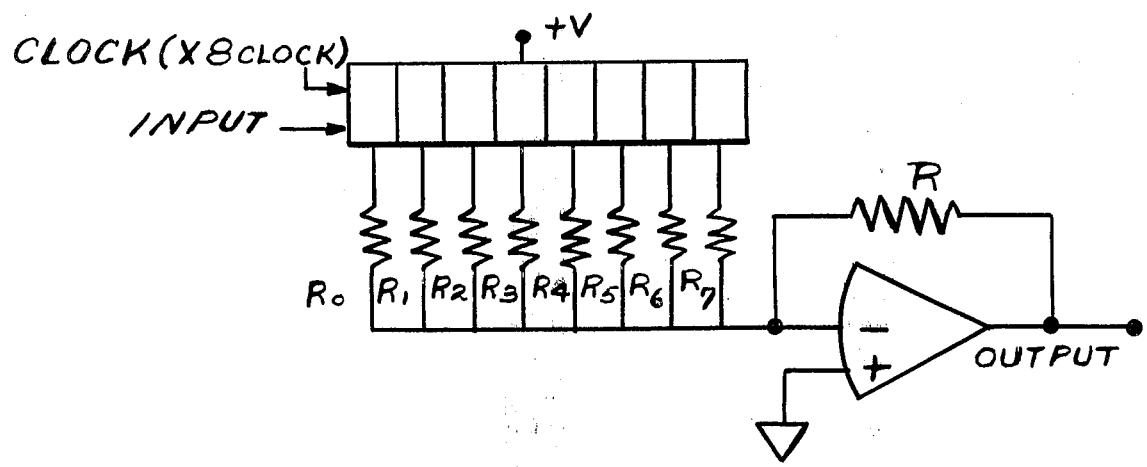
FIG. 6 is a schematic diagram of the basic structure of the time domain filter.

Time domain filter 312 shapes the pulses to a raised cosine as shown in FIG. 5(j). This filtering is performed by shift registers clocked at 8X data rate and having weighted outputs. The basic structure of the shift register filter is shown in FIG. 6.

Figure 7:
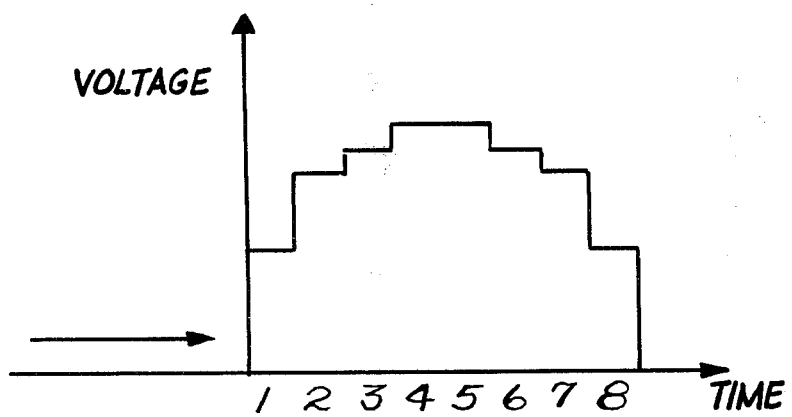
FIG. 7 is a graphical representation of the operation of the basic filter structure shown in FIG. 6.

The conductances of $R_0$–$R_7$ are $g_0$–$g_7$ and $1/R = g$. When a "1" is applied to the input, an output voltage shape is produced as shown in FIG. 7.

Figure 8:
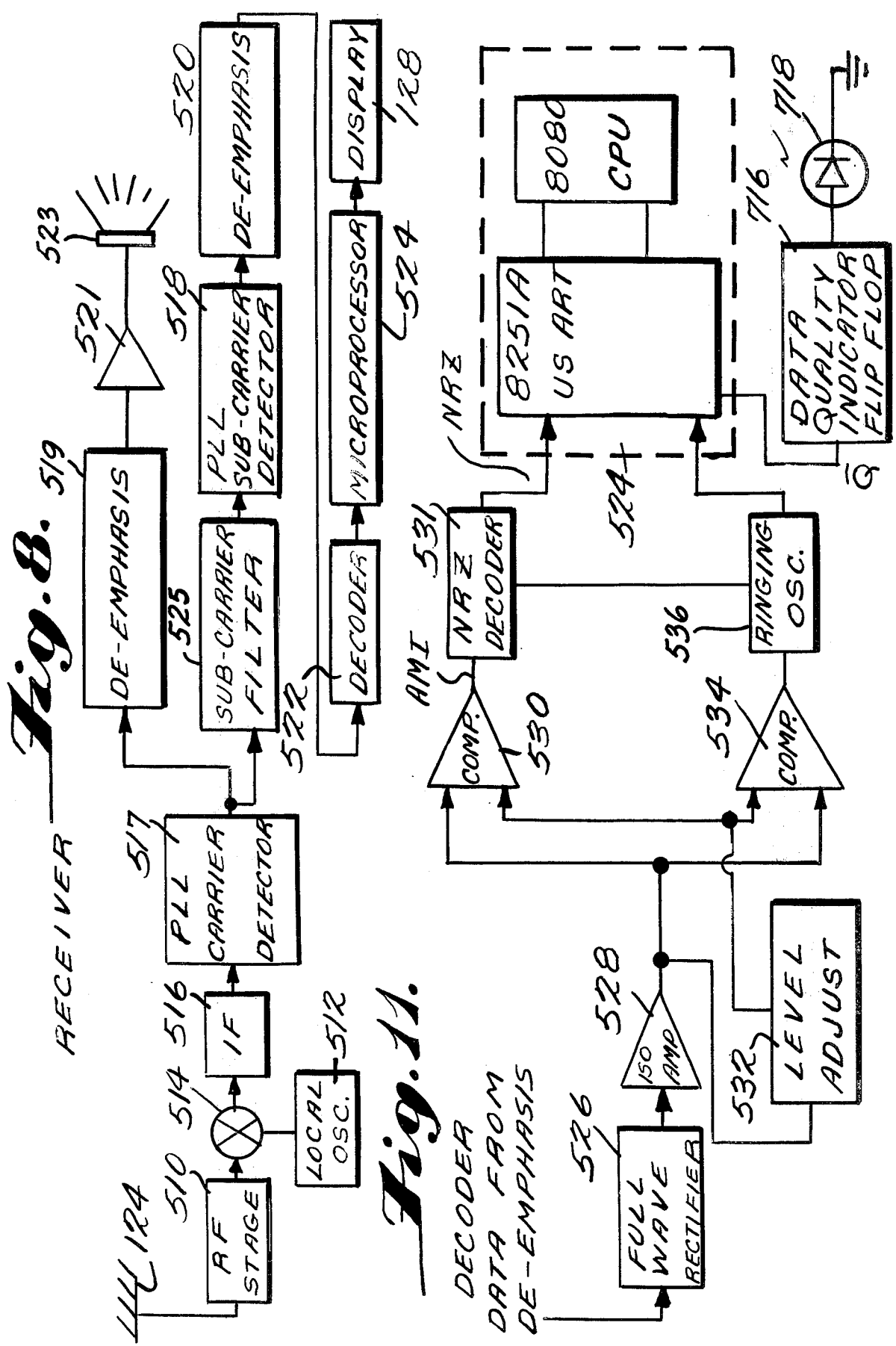
FIG. 8 is a block diagram of the receiver.

Referring now to FIG. 8, there is shown a general block diagram of receiver 126. Signals received through antenna 124 are amplified and filtered by an RF stage 510. A local oscillator 512 provides a mix signal for mixer 514 which generates the intermediate frequency (IF). An IF stage 516 further amplifies and filters the translated signal. At this point, the signal includes not only data originated by the originating subscriber at input terminal 100, but also includes the commercial broadcast information generated by stereo generator 202 (see FIG. 2).

The broadcast carrier is detected by a phase locked loop (PLL) carrier detector 517. The commercial broadcast program is then de-emphasized by a conventional de-emphasis network 519, after which it is amplified by an amplifier 521 and coupled to a speaker 523 if desired.

The output of PLL carrier detector 517 is also coupled to a sub-carrier filter 525 which filters to a bandwidth essentially from 53 to 71 KHz. The filtered sub-carrier signal then coupled to a phase locked loop sub-carrier detector 518 which detects the 67 KHz sub-carrier carrying the data as linear frequency modulation thereon. The detected sub-carrier is then subjected to a de-emphasis by a de-emphasis network 520 which compliments pre-emphasis network 322 shown in FIG. 3. Thus, the data is restored to an unemphasized form. Once de-emphasized the data is coupled to a decoder 522 for demodulating the data originated at input terminal 100. The decoder converts the AMI transmissions back to NRZ format as required by microprocessor input. Decoder 522 also provides clock recovery by the use of a ringing oscillator so that both data and clock can be coupled to a microprocessor 524 within the receiver. Microprocessor 524 recognizes data intended for a particular receiving subscriber and causes it to be displayed by display 128 (see FIG. 1).

Microprocessor 524 includes an 8080 CPU and 8251 USART. The microprocessor can be programmed to recognize the address to which data is directed and determine whether it is intended for that particular receiving subscriber or not. If data is not intended for a particular subscriber, the data is ignored. However, if the data is intended for that particular receiving subscriber, the data is accumulated and displayed by display 128. Display 128 is preferably a printer. In addition, microprocessor 524 can be programmed to perform a parity check operation as set forth in FIG. 9.

Figure 9:
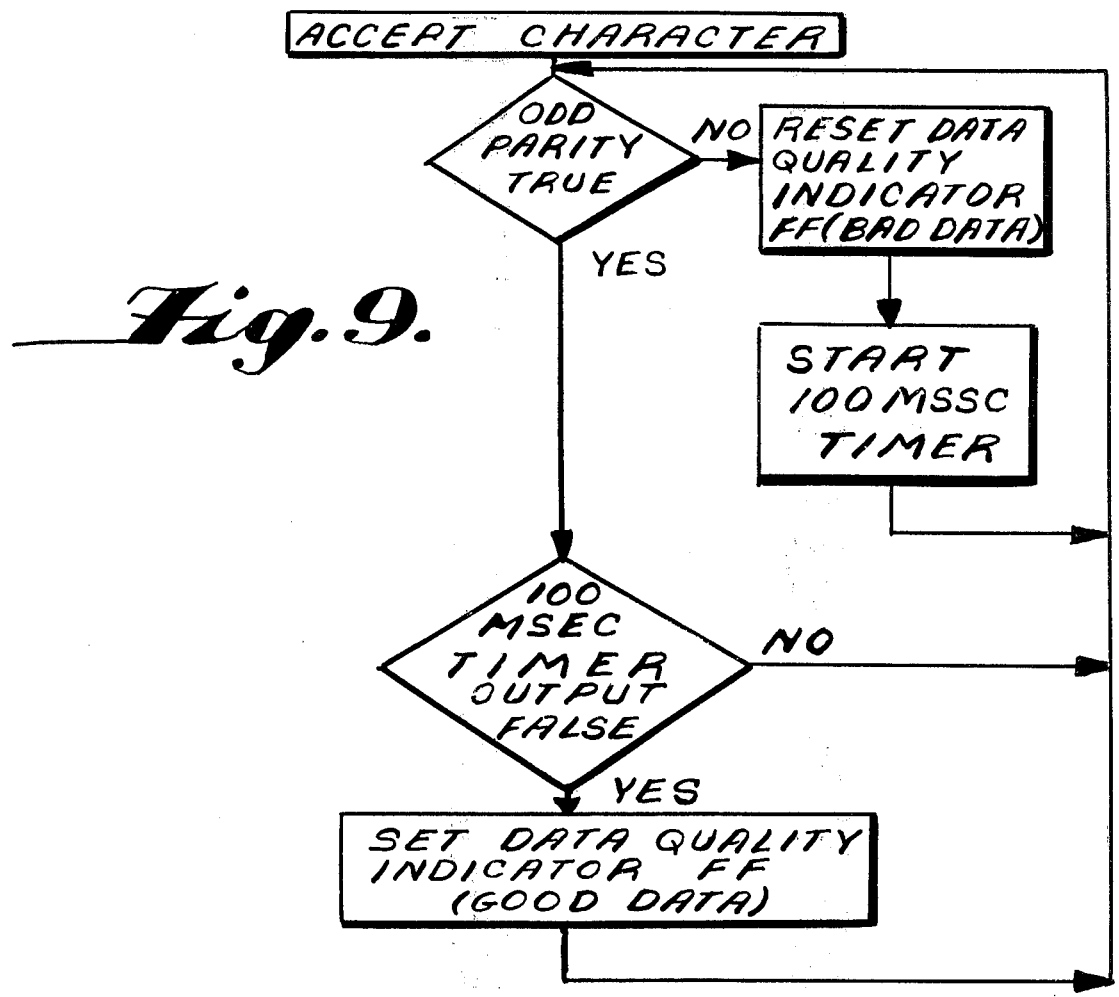
FIG. 9 is a flow chart showing the parity checking function of the receiver.

Referring now to FIG. 9, an incoming character (having 8 bits) is accepted. It is then determined whether or not there is odd parity. If not, the data quality indicator flip-flop is reset, triggers a 100 m sec. timer, and the next incoming character is tested. Whenever a character demonstrates odd parity it is determined whether 100 m sec. has elapsed by the timer. If 100 m sec has elapsed, the data quality indicator flip-flop is set. If, however, 100 m sec. have not elapsed, the next incoming character is tested. Thus, if an indicator is coupled to the output of the data quality indicator flip-flop, it will turn off for 0.1 sec. when a parity check fails to indicate correct parity. The parity light will stay off for very poor quality data and stay on for excellent quality data.

Figure 10:
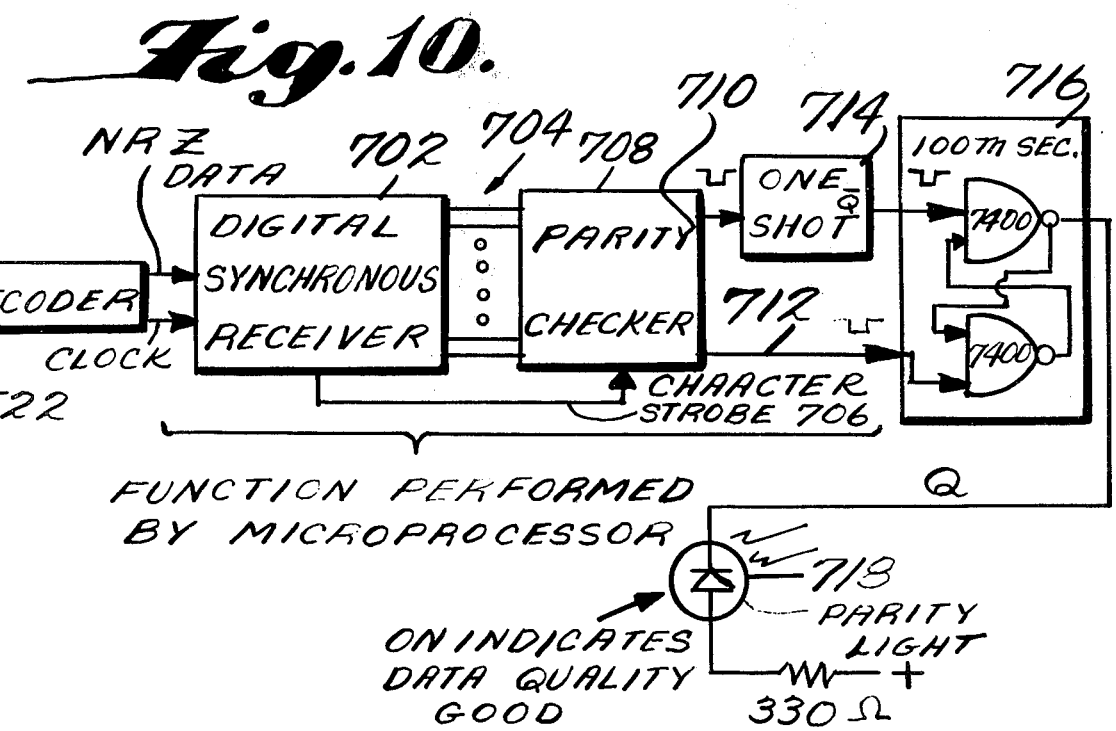
FIG. 10 is one possible embodiment of the parity checking function of the receiver.

Referring now to FIG. 10, there is shown a "hardware" embodiment of the parity checking operation. NRZ data and clock pulses are coupled to a digital synchronous receiver 702 having eight parallel output lines 704 for the eight bits of a character and having a character strobe line 706. The eight character bit lines 704 and character strobe 706 are coupled to a parity checker 708. Parity checker is advantageously arranged to cause a pulse to appear on a signal line 710 when parity is incorrect and to cause a pulse to appear on a signal line 712 when parity is correct. Signal line 710 is coupled to a 100 m sec. one shot 714. The output of one shot 714 is coupled to one input of a data quality indicator flip-flop 716. The other input of flip-flop 716 is coupled to signal line 712. The output of flip-flop 716 is coupled to a parity light 718 which is, advantageously a light emitting diode.

The use of a parity checker and parity light is particularly advantageous because it provides an indication that data is being received accurately. Merely determining that the sub-carrier detected in the receiver has sufficient signal strength is insufficient to insure accurate data transfer because intermodulation products, particularly resulting from multi-path transmission, can destroy the integrity of the data while the signal strength of the sub-carrier is maintained.

Parity light 718 serves dual functions. It lighted condition indicates that there is sufficient sub-carrier signal strength and that data is being received. Furthermore, when a parity check operation is performed and a parity error is noted, parity light 718 is turned off by flip-flop 716 for 0.1 sec. A flashing parity light indicates to the receiving subscriber that multi-path transmission or cross modulation is occurring and that some readjustment is called for. Either there is data quality problem at the transmitter or the receiving antenna is in need of adjustment to eliminate multi-path reception. A further detailed block diagram of decoder 522 is shown in FIG. 11.

Referring now to FIG. 11, there is shown a block diagram of decoder 522. Data from de-emphasis network 520 is coupled to full wave rectifier stage 526 thereby producing data having a voltage swing in only one direction from a zero reference. Rectified data from full wave rectifier stage 526 is coupled through an isolation amplifier 528.

In order to recognize whether a data bit is present or not, a comparator 530 examines the data stream with respect to predetermined threshold level generated by level adjustment circuit 532. Level adjustment circuit 532 continuously examines the data stream and adjusts the threshold level in accordance with certain predetermined average value criteria and includes a detect and hold circuit.

In addition, a second comparator 534 compares the data stream with a second threshold level higher in magnitude than the threshold level utilized by comparator 530. The output of comparator 534 is used to trigger a ringing oscillator 536. Ringing oscillator 536 oscillates for approximately 16 pulses each time it is triggered. Oscillation is at the clock frequency. Thus, if only one data bit out of 8 is detected by comparator 534, ringing oscillator 536 will still continuously supply clock pulses for use by microprocessor 524. In this manner, the clock is recovered even though a separate clock pulse signal is not transmitted by the transmitter. The output of comparator 530 is coupled through a NRZ decoder 531 for converting the data into NRZ format compatible with microprocessor 524. Microprocessor 524 includes an 8251 A USART (Intel) and an 8080 CPU (Intel). As described with reference to FIG. 10, the parity checking function of microprocessor 524 includes its coupling to a data quality indicator flip-flop 716 for driving a parity light 718. A detailed schematic diagram of the receiver 126 is shown in FIGS. 12A and 12B.

Figure 12A:
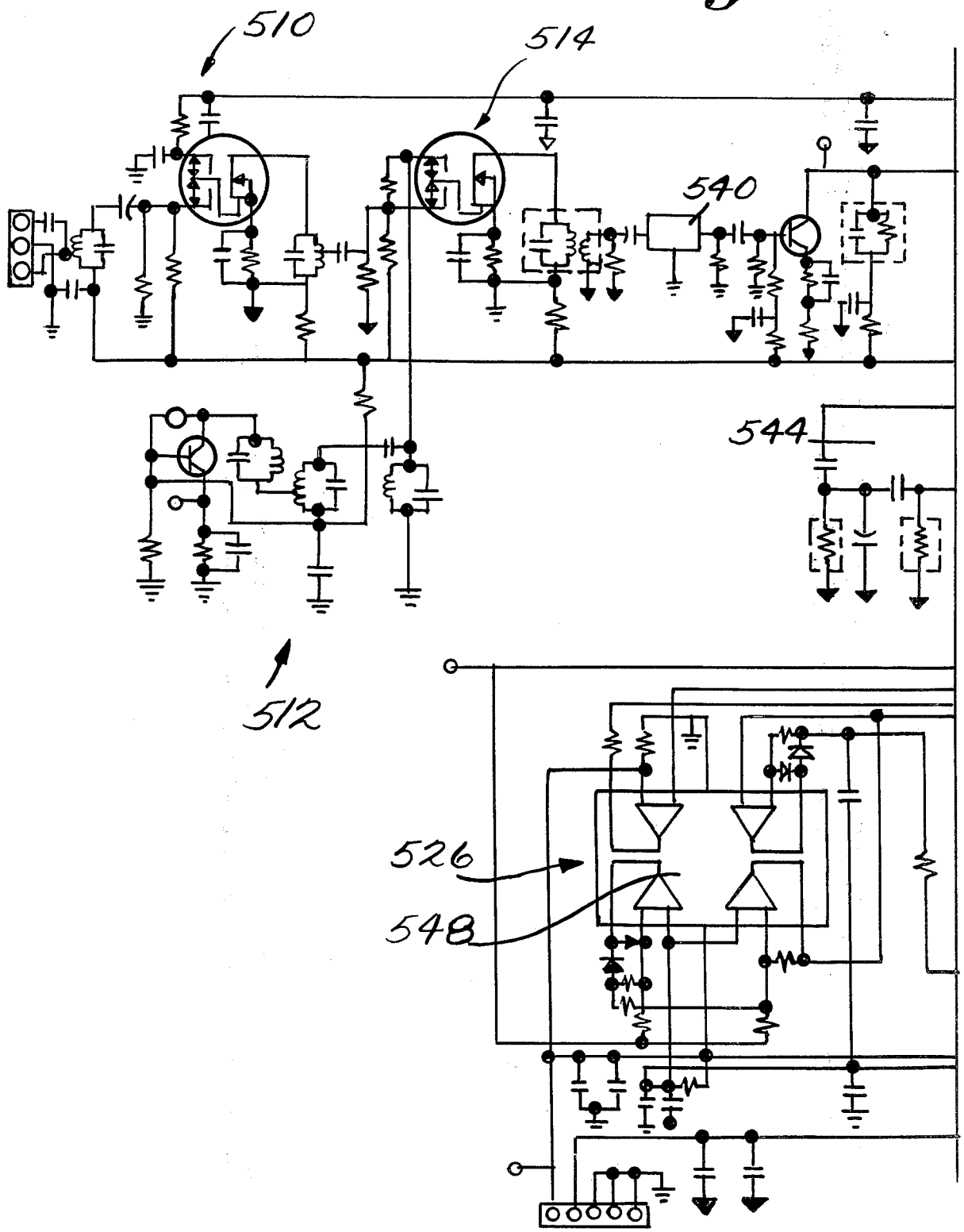
FIGS. 12A and 12B are detailed schematic diagrams of the receiver.
Figure 12B:
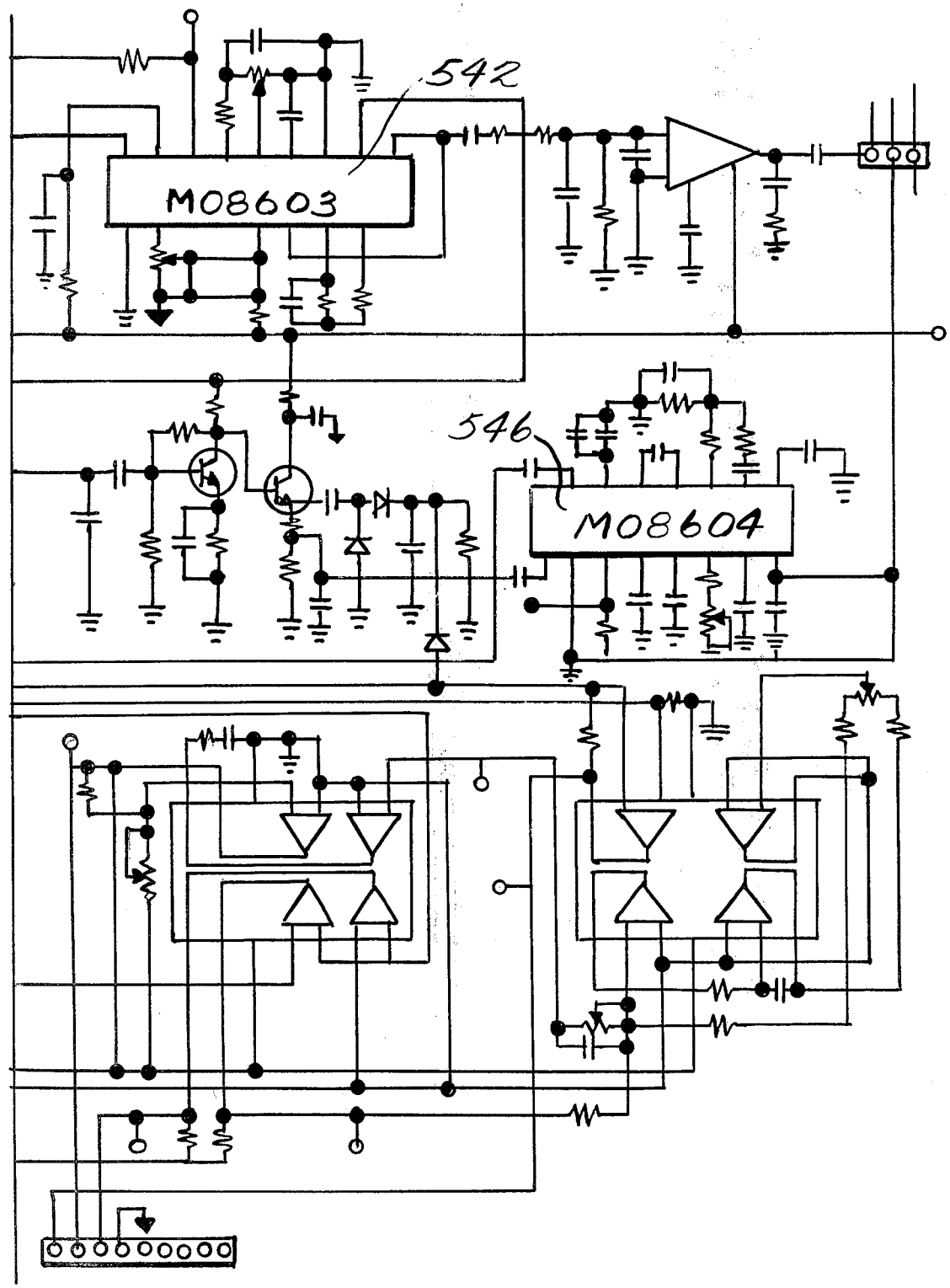

Referring now to FIGS. 12A and 12B, there is shown detailed schematic diagrams of receiver 126. Signals received via receiving antenna 124 are coupled to RF stage 510 and then mixed by a mixer 514 with a local oscillator signal from local oscillator 512. A phase locked loop detector 542 detects the entire signal transmitted by the broadcast station and includes both the broadcast information and data originated by input terminal 100.

A 67 MHz filter 544 and a second phase lock loop detector 546 detects and extracts information from the 67 KHz sub-carrier. Thus, data generated by input terminal 100 is detected at this stage.

The output of phase lock loop sub-carrier detector 546 is coupled through de-emphasis network 522 decoder 522. Decoder 522 includes full wave rectifier stage 526 including integrated circuit 548. Integrated circuit 548 includes four amplifiers with associated diodes forming a full wave rectifier circuit. The rectified data signal from full wave rectifier circuit 526 is coupled to comparators 530 and 534 for comparison with threshold levels. The entire receiver is manufactured by and is available through SCI Systems, Inc. of Huntsville, Ala.

By employing the apparatus described, a method of data transmission is defined for transmitting digital data at a high bit rate. Data generated by a subscriber is shaped by using a time domain filter having a close approximation to a raised cosine response. The shaped data is then used to frequency modulate (direct angle) a sub-carrier. The sub-carrier in turn is used to frequency modulate a broadcast carrier which is transmitted to a receiving subscriber. The sub-carrier signal is detected and decoded after which decoded data is displayed.

By using direct angle modulation of a sub-carrier and by using raised cosine time domain shaping of the message data in the frequency domain, the system described is capable of accurately transferring data from an originating subscriber to a receiving subscriber at 4800 baud.

Therefore it is apparent that there has been defined a data transmission system and method for transmitting digital data at high bit rates using linear frequency modulation.

Obviously, other embodiments and modifications of the present invention will readily come to those of ordinary skill in the art having the benefit of the teachings presented in the foregoing description and drawings. It is therefore to be understood that this invention is not limited thereto and that said modifications and embodiments are intended to be included within the scope of the appended claims.

What is claimed is:

1. A method of transmitting data at a speed of at least about 4,800 bits per second comprising the steps of:
   generating digital data;
   containing the bandwidth of the transmitted data by converting said digital data to a bipolar line code format, said bipolar line code format including transitions in the absence of said generated digital data;
   shaping the converted digital data in the time domain to produce shaped digital data;
   frequency modulating a sub-carrier of a commercial broadcast channel with the shaped digital data to produce a modulated sub-carrier; and
   frequency modulating a carrier with the modulated sub-carrier.

2. A method of transmitting data at a speed of at least about 4,800 bits per second comprising the steps of:
   generating digital data;
   containing the bandwidth of the transmitted data by converting said digital data to a bipolar line code format, said bipolar line code format including transitions in the absence of said generated digital data;
   shaping the converted digital data in the time domain with substantially a raised cosine response to produce shaped digital data, said shaping step including in the step of coupling said converted digital data through a shift register filter having substantially a raised cosine response in the time domain;
   frequency modulating a sub-carrier of a commercial broadcast channel with the shaped digital data to produce a modulated sub-carrier; and
   frequency modulating a carrier with the modulated sub-carrier.

3. A data transmission method according to claims 1 or 2 wherein said containing step includes the step of converting said digital data to an alternate mark inversion (AMI) line code format.

4. A method of transmitting data at a speed of at least about 4,800 bits per second comprising the steps of:
   generating digital data;
   containing the bandwidth of the transmitted data by converting said digital data to a bipolar line code format, said bipolar line code format including transitions in the absence of said digital data;
   shaping the converted digital data in the time domain to substantially a raised cosine response to produce shaped digital data;
   frequency modulating a sub-carrier of a commercial broadcast channel with the shaped digital data to produce a modulated sub-carrier;
   frequency modulating a carrier with the modulated sub-carrier to produce a data modulated carrier;
   transmitting the data modulated carrier;
   receiving the data modulated carrier;
   detecting the frequency modulated sub-carrier; and
   decoding the digital data.

5. A data transmission method according to claim 4 wherein said shaping step comprises:
   coupling the digital data through a shift register filter having substantially a raised cosine response in the time domain.

6. The method of transmitting data of claim 4 or 5 wherein said step of generating digital data includes generating digital information data and generating at least one parity character; and
   wherein said step of decoding the digital data includes the steps of decoding the digital information data,
   checking the parity of the parity character; and
   energizing a visible indicator when the parity check fails to thereby provide visual indication of error in the system.

7. A data transmission system for the radio frequency transmission of digital data at a speed of at least about 4,800 bits per second comprising:
   means for generating digital data;
   means for containing the bandwidth of the transmitted data, said containing means comprising means for converting said digital data to a bipolar line code format, said bipolar line code format including transitions in the absence of said digital data;
   means for shaping said converted digital data in the time domain with substantially a raised cosine response to produce shaped digital data;
   means for linearly frequency modulating a sub-carrier of a commercial broadcast channel with said shaped digital data to produce a modulated sub-carrier; and
   means for frequency modulating a carrier of said commercial broadcast channel with said modulated sub-carrier.

8. A data transmission system according to claim 7 wherein said means for shaping comprises:
   a shift register filter having substantially a raised cosine response in the time domain.

9. A data transmission system according to claim 7 or 8 wherein said converting means comprises means for converting said digital data to an alternate mark inversion (AMI) line code format.

10. A data transmission system for transmitting data at a speed of at least about 4,800 bits per second comprising:
    means for generating digital data;
    means having said digital data as an input for containing the bandwidth of the transmitted data, said bandwidth containing means including means for converting said digital data to a bipolar line code format, said bipolar line code format generating transitions in the absence of said generated data, to produce converted digital data at its output;
    means, having said converted digital data as an input, for shaping said converted digital data in the time domain with substantially a raised cosine response to produce shaped digital data at its output;

means having as an input said shaped digital data for frequency modulating a sub-carrier of a commercial broadcast channel with said shaped digital data to produce a modulated sub-carrier at its output;

means having said modulated sub-carrier as an input for frequency modulating a carrier of said commercial broadcast channel with said modulated subcarrier to produce a data modulated carrier at its output;

means having said data modulated carrier as an input for transmitting said data modulated carrier;

means for receiving said data modulated carrier;

means coupled to the output of said means for receiving for detecting said modulated sub-carrier to provide a detected signal as an output; and means coupled to the output of said means for detecting for decoding from said detected signal, said digital data.

11. A data transmission system for transmitting data at a speed of at least about 4,800 bits per second comprising:

means for generating digital data including digital information data and at least one parity checking character;

means having said digital data as an input for containing the bandwidth of the transmitted data by converting said digital data in accordance with a bipolar line code, said bipolar line code generating transitions in the absence of said digital data, to produce converted digital data at its output;

means, having said converted digital data as an input, for shaping said converted digital data in the time domain with a substantially raised cosine response to produce shaped digital data at its output;

means having as an input said shaped digital data for linearly frequency modulating a sub-carrier of a commercial broadcast channel with said shaped digital data to produce a modulated sub-carrier at its outptut;

means having said modulated sub-carrier as an input for frequency modulating a carrier of said broadcast channel with said modulated sub-carrier to produce a data modulated carrier at its output;

means having said data modulated carrier as an input for transmitting said data modulated carrier;

means for receiving said data modulated carrier;

means coupled to the output of said means for receiving for detecting said modulated sub-carrier and providing a detected signal as an output;

means coupled to the output of said means for detecting for decoding, from said detected signal, the digital data; and indicator means receiving an input from said means for decoding for indicating when the parity of a predetermined number of parity checking characters fails to meet certain predetermined criteria.

12. The data transmission system of claim 11 wherein said means for shaping comprises a shift register filter having substantially a raised cosine response in the time domain.

13. A data transmission system according to either of claim 11 or 12 wherein said converting means comprises means for converting said data into an alternate mark inversion (AMI) line code format.

14. A signal shaper for a data transmission system wherein digital data to be transmitted is shaped and then used to frequency modulate a sub-carrier; the sub-carrier in turn being used to frequency modulate a carrier; said signal shaper comprising:

a bipolar line code generator receiving said digital data for converting said data into a format having positive and negative half signals and transitions in the absence of said digital data;

first and second means for shaping said positive and negative half signals, respectively, in the time domain with substantially a raised cosine response to produce first and second shaped signals; and means for combining said first and second shaped signals to produce a bipolar line code signal shaped in the time domain with substantially a raised cosine response.

15. A signal shaper according to claim 14 wherein each of said first and second means for shaping comprises:

a shift register clocked at a predetermined rate having successive stages for receiving said positive and negative half-signal at a first stage thereof; and weighting resistors coupled to said stages having values selected in accordance with said predetermined clock rate for creating a plurality of signals at said successive stages, respectively, which when summed form substantially a raised cosine response in the time domain as said data is clocked through said successive stages of said shift register.

16. A data transmission system for transmitting data at a speed of at least about 4,800 bits per second comprising:

means for generating digital data including digital information data and at least one parity checking character;

means having said digital data as an input for converting said digital data into a bipolar line code format, said bipolar line code format including positive and negative half signals having transitions in the absence of said digital information data, to produce converted digital data at its output;

means, having said converted digital data as an input, for shaping said converted digital data in the time domain with a substantially raised cosine response to produce shaped digital data at its output;

means having as an input said shaped digital data for linearly frequency modulating a sub-carrier with said shaped digital data to produce a modulated sub-carrier;

means having said modulated sub-carrier as an input for frequency modulating a carrier with said modulated sub-carrier to produce a data modulated carrier at its output;

means having said data modulated carrier as an input for transmitting said data modulated carrier;

means for receiving said data modulated carrier;

means coupled to the output of said means for receiving for detecting said modulated sub-carrier having a detected signal as an output;

means coupled to the output of said means for detecting for decoding from said detected signal, said digital data;

means coupled to the output of said means for detecting for checking the parity of said parity checking character; and means coupled to the output of said means for checking for indicating the presence of a correct parity check by means of a real time visual indicator.

17. The data transmission system according to claim 16 further including means for indicating when the received signal strength is above a predetermined threshold level.

18. A data transmission system according to the claim 17 wherein said means for indicating the presence of a correct parity check and said means for indicating a received signal strength together comprise:

an indicator circuit including an indicator, said indicator being off when the signal strength is below the predetermined threshold level, said indicator being on when the threshold level and the parity is correct, and said indicator flashing when the signal strength is above the predetermined threshold level and the parity is incorrect.

19. A data transmission system for transmitting data at a speed of at least 4,800 bits per second comprising:

a plurality of digital data generators for use by originating subscribers, said digital data generators for generating digital data including information data and an address of an intended receiving subscriber;

at least one commercial broadcast FM station;

a central message switcher receiving inputs from said generators for selecting said at least one commercial broadcast FM station in response to the address generated by a digital data generator and providing to the selected station the data generated by that generator;

first means for coupling said plurality of digital data generators to said central message switcher;

second means for coupling the digital data coupled to said central message switcher to said selected broadcast FM station;

means at said selected broadcast FM station for converting the digital data coupled by said second means to a bipolar line code format, said bipolar line code format including positive and negative half signals and transitions in the absence of input digital data;

means, having said converted data as an input, for shaping the digital data in the time domain with a substantially raised cosine response to produce shaped digital data at its output;

means having as an input said shaped digital data for linearly frequency modulating a sub-carrier with said shaped digital data to produce a modulated sub-carrier at its output;

means having said modulated sub-carrier as an input for frequency modulating a carrier with said modulated sub-carrier to produce a data modulated carrier at its outpt;

means have said data modulated carrier as an input for transmitting said data modulated carrier;

means for receiving said data modulated carrier;

means coupled to the output of said means for receiving for detecting said modulated sub-carrier to provide a detected signal output; and means coupled to the output of said means for detecting for decoding from said detected signal, said digital data and displaying the data at the address selected receiving subscriber.

* * * * *